United States Patent [15] 3,671,569
Chabardes et al. [45] June 20, 1972

[54] PROCESS FOR THE PREPARATION OF ALIPHATIC DINITRILES

[72] Inventors: Pierre Chabardes; Pierre Gandilhon; Charles Grard, all of Lyon; Michel Thiers, Birgnais, all of France

[73] Assignee: Rhone-Poulenc S.A., Paris, France

[22] Filed: March 18, 1966

[21] Appl. No.: 535,322

[30] Foreign Application Priority Data

March 18, 1965 France.....................................659738
July 19, 1965 France..................................6525155
Dec. 2, 1965 France..................................6540725

[52] U.S. Cl......................260/465.8 D, 260/464, 260/465.1
[51] Int. Cl.........................................................C07c 121/26
[58] Field of Search...............................260/465.8, 465.8 D

[56] References Cited

UNITED STATES PATENTS

| | | | |
|---|---|---|---|
| 2,999,107 | 9/1961 | Lindsey, Jr. et al. | 260/465.8 |
| 3,013,066 | 12/1961 | Alderson | 260/486 |
| 3,322,815 | 5/1967 | Feldman et al. | 260/465.5 |
| 3,350,439 | 10/1967 | Feldman et al. | 260/465.5 |

FOREIGN PATENTS OR APPLICATIONS 1,411,003  10/1965  France.................................260/465.8

*Primary Examiner*—Joseph P. Brust
*Attorney*—Stevens, Davis, Miller & Mosher

[57] ABSTRACT

1,4-Dicyanobutene and adiponitrile are made by heating acrylonitrile with a ruthenium catalyst in the presence of hydrogen.

5 Claims, No Drawings

PROCESS FOR THE PREPARATION OF ALIPHATIC DINITRILES

The present invention relates to the preparation of 1,4-dicyanobutenes and/or adiponitrile by the dimerization of acrylonitrile.

It is known that heating a mixture of acrylonitrile and tertiary phosphines yields 2,4-dicyanobutene-1 (French specification No. 1,366,081) whose hydrogenation yields 2-methylglutaronitrile. It is also known that heating a mixture of acrylonitrile, a tertiary phosphine and a proton donating agent such as water, or an alcohol (French Specification No. 1,385,883) gives a mixture of straight-chain or branched monoethylenic dinitriles having six carbon atoms; however, the amount of straight chain dimer is always low. It is also known to dimerize acrylonitrile to give 1,2-dicyanocyclobutane the hydrogenolysis of which gives adiponitrile, but this method requires the use of high temperatures and pressures. It has also been suggested to convert acrylonitrile directly to adiponitrile by hydrodimerization methods which resort to the use of nascent hydrogen. Thus, according to U.S. Pat. No. 3,133,956, adiponitrile may be obtained by reacting acrylonitrile in aqueous solution with a dispersion of finely divided sodium in an inert organic solvent. The yields of adiponitrile are always low, both relative to the acrylonitrile and relative to the metallic sodium consumed. Equally, treating acrylonitrile with magnesium in a primary aliphatic monoalcohol, in the presence of mercuric chloride as an activator, according to U.S. Pat. No. 2,439,308, only gives low yields of adiponitrile.

French specification No. 1,229,702 describes a method of dimerizing alpha-olefines as well as alpha-olefinic functional derivatives, by heating them under pressure in the presence of a salt of a noble metal of Group VIII of the Periodic Table. Though it is true that acrylic esters may be dimerized by this method, it has been observed that the method does not permit the dimerization of acrylonitrile.

A process for the preparation of 1,4-dicyanobutenes and/or adiponitrile has now been found, starting from acrylonitrile and taking place directly in a single stage, this method comprising heating acrylonitrile under a hydrogen pressure of 1 to 50 bars in the presence of, as catalyst, an organic or inorganic ruthenium derivative. There are obtained by this process straight chain dinitriles to the substantial exclusion of branched or cyclic products such as methylglutaronitriles or 1,2-dicyanocyclobutane.

The predominant formation of 1,4-dicyanobutenes or of adiponitrile is linked to the working conditions and to the ruthenium catalyst which is used. A judicious choice of conditions allows the reaction to be directed towards the predominant formation of one or other of these products, and also enables the formation of propionitrile, which is a by-product resulting from the hydrogenation of acrylonitrile, to be reduced.

The catalysts which may be used according to the method of the invention are inorganic or organic ruthenium derivatives, preferably salts of mineral or organic acids. Examples of suitable catalysts are halides, thiocyanates, salts of oxygen-containing mineral acids such as the sulphates, nitrates, oxyhalides and hydroxyhalides, and salts of organic aliphatic, cycloaliphatic or aromatic acids such as the acetate, oxalate, stearate or naphthenate. The alcoholates and phenates may also be used. As other inorganic or organic ruthenium compounds there may be named the alkali and alkaline earth ruthenates, mixed salts of ruthenium and an alkali metal, such as the halogenoruthenates of sodium or potassium, and halogenated or nitrosylated or aminated derivatives such as nitrosochlororuthenium or trichlororuthenium hexamine. Chelates such as the acetylacetonates, optionally substituted by, for example, aliphatic or cycloaliphatic groups or by halogen atoms, such as 3-bromo-2,4-pentadionatoruthenium (III) or 1,1,1-trifluoro 2,4-pentadionatoruthenium (III), glyoximates, quinolinates, salicylaldehydates, and derivatives of ethylene diamine, $\alpha$, $\alpha'$-dipyridyl and o-phenanthroline are also suitable. Other catalysts which are particularly suitable are the complexes which ruthenium derivatives form with electron donating agents. Such complexes are, for example, obtained by using, as the ruthenium derivatives, halogenated, carbonylated or nitrosylated ruthenium derivatives, and as the electron donating agents, substances having lone electron pairs such as the phosphines, arsines, stibines, amines or substances capable of forming structures having lone electron pairs and thus also able to act as electron donors. It is thus possible to use complexes formed with the electron donating agents specifically named in French specification No. 1,337,558. Complexes which are suitable may be obtained from the reaction of ruthenium compounds, especially the halides and hydridohalides, with aliphatic or cycloaliphatic monoolefines and diolefines, such as for example butadiene, isoprene or cyclooctadiene, with activated olefines such as acrylic or methacrylic derivatives like acrolein, methacrolein or acrylamide, with saturated or unsaturated aliphatic, cycloaliphatic or aromatic nitriles such as acetonitrile, propionitrile, acrylonitrile, methacrylonitrile, cyanocyclohexane, benzonitrile, or toluonitrile, and with saturated or unsaturated dinitriles such as malonitrile, succinonitrile, adiponitrile, dicyanobutanes, dicyanocyclobutanes, dicyanobutenes, and aliphatic or aromatic isonitriles. Such complexes may be produced by heating a ruthenium halide with an electron donor, optionally in the presence of a solvent which may itself participate in the preparation of the complex.

An amount of catalyst corresponding to an amount of metallic ruthenium ranging from 0.04 to 1.2 percent by weight of the acrylonitrile which it is intended to treat is generally suitable for the implementation of the method of the invention. However these limits are not rigid and in the case of particularly reactive ruthenium derivatives such as ruthenium trichloride or ruthenium acetylacetonate smaller amounts such as for example 0.01 percent or even 0.001 percent of ruthenium may be used. The catalysts may be used in the solid state, in a subdivided form, in suspension or in solution in water or in an organic solvent which is inert under the conditions of the reaction. The catalysts do not change, or change only very slightly, during the course of the reaction and they may be reused a number of times without it being necessary to regenerate them each time.

It is essential for the reaction to be carried out in the presence of hydrogen, which may be introduced into the reaction zone all at once or in batches, or even continuously so as to maintain a constant hydrogen pressure. The pressure and temperature may vary between certain limits, most commonly 1 to 50 bars pressure and 50° to 150° C. temperature. It is not advantageous to work outside these limits. Below the lower limits, the reaction takes place slowly, whereas above the upper limits a considerable amount of propionitrile is formed by the direct hydrogenation of acrylonitrile, to the detriment of the yield of the desired products. The most advantageous working conditions are in the range of 5 to 40 bars and 100° to 130° C. Depending on the working conditions, there are obtained 1,4-dicyanobutenes or adiponitrile or their mixtures. In order to obtain 1,4-dicyanobutenes to the exclusion of adiponitrile, or at least to produce as little adiponitrile as possible, it is advantageous to work at the lower hydrogen pressure. It is also possible to limit the reaction to the formation of 1,4-dicyanobutenes by lowering the reaction temperature or reducing the duration of heating. Finally, the reaction may also be directed towards the formation of dicyanobutenes by choosing a less active catalyst, or by using a more active catalyst but at a low degree of conversion, or by working in a dilute medium.

In order to obtain exclusively, or almost exclusively, adiponitrile it is conversely advisable to use hydrogen at a higher pressure. It is either possible to work with a single introduction of hydrogen if under the working conditions (volume of apparatus and initial pressure) the pressure, while diminishing, nevertheless remains always sufficiently high to give the desired result, or preferably to work with the replacement, or continuous feed, of hydrogen so as to keep the hydrogen pressure constant at a suitable higher value. For a given pressure, the reaction may also be directed towards the predominant formation of adiponitrile by again using the effect of temperature, or the nature of the catalyst and of its amount in the reaction mixture. Increasing the proportion of catalyst has the effect of directing the reaction towards the formation of adiponitrile. It is thus seen that both for the formation of 1,4-dicyanobutenes and for the formation of adiponitrile there is a close relationship between the working conditions and it is possible that in certain cases one obtains neither one or the other of these dinitriles but mixtures of both. These mixtures may be subjected to catalytic hydrogenation in order to convert them quantitatively to adiponitrile, as may also be done for the 1,4-dicyanobutenes alone.

The acrylonitrile used in the reaction may either be commercially available acrylonitrile or freshly distilled and unstabilized acrylonitrile, or also distilled acrylonitrile to which very small amounts of stabilizers such as hydroquinone, p-tertiary butyl pyrocatechol, p-nitrosodimethylaniline or ammonia are added.

The reaction may be carried out in the presence or absence of an auxiliary diluent, which is liquid and inert under the working conditions. Amongst these diluents there may be named water, alcohols such as methanol or ethanol, glycols, glycol ethers such as methoxyethanolordiethyleneglycol dimethyl ether, cyclic ethers such as dioxane and tetrahydrofuran, aliphatic, cycloaliphatic or aromatic hydrocarbons such as benzene or cyclohexane, nitriles such as acetonitrile or propionitrile, nitro-derivatives or amides.

When the reaction is ended the unconverted acrylonitrile may be isolated by distilling the reaction mixture at 80° to 100° C at normal pressure, as may be the solvent or diluent and the propionitrile, which is the only volatile by-product formed. The 1,4-dicyanobutenes and/or adiponitrile are thereafter separated off by distillation in vacuo. The catalyst may be separated from the reaction mixture by any known method, and may be recycled.

The following Examples illustrate the invention and show the effects of varying different factors individually or jointly.

EXAMPLE 1

The following are charged into a 125 cm³ stainless steel autoclave:

16 g (0.3 mole) of acrylonitrile stabilized by a
1/1000 part by weight of hydroquinone,
0.2 g of ruthenium trichloride, and
30 cm³ of methoxyethanol.

An initial hydrogen pressure of 40 bars is set up and the mixture then heated to 110° C. for 16 hours, after which the reaction mixture is distilled at normal pressure and 1 g of unreacted acrylonitrile, propionitrile, and 28 cm³ of methoxyethanol are removed between 76° and 120° C. The remainder of the reaction mixture is then distilled in vacuo and there are obtained 7.4 g of a fraction of b.p.$_{0.4}$ = 97° to 108°C, $n_D^{25}$ = 1,4646, consisting principally of a mixture of cis 1,4-dicyanobutene-1 and trans 1,4-dicyanobutene-1, together with a little adiponitrile (3 percent). The yield is 49.3 percent of theory relative to the acrylonitrile consumed. Hydrogenation of these dimers at normal pressure and temperature, in the presence of palladium on charcoal and in a methanol medium, quantitatively yields adiponitrile which on hydrolysis is converted to adipic acid melting at 150° to 151° C., with a yield of 97 percent relative to the theoretical yield.

On repeating the same experiment but without using hydrogen, no dimerization product is obtained. The same negative result is obtained if nitrogen is used in place of hydrogen, the initial pressure again being 40 bars.

EXAMPLE 2

On repeating the experiment of Example 1 but working with acrylonitrile stabilized with 0.005 percent by weight of ammonia, the same result is obtained as in Example 1.

EXAMPLES 3 TO 9

Working under the conditions of Example 1, with the same amounts of reagents, but with the methoxyethanol in each case replaced by a different solvent, the following results are obtained:

| Ex. | Solvent | Dicyanobutene obtained (in g.) | Adiponitrile obtained (in g.) | Overall yield relative to acrylonitrile consumed, percent |
|---|---|---|---|---|
| 3 | Tetrahydrofuran | 3.2 | 1.2 | 35 |
| 4 | Diethyleneglycol dimethyl ether | 3.85 | 1.65 | 35 |
| 5 | Methanol | 3 | | 30 |
| 6 | Hexamethyl phosphoramide | 2.88 | 3.82 | 42 |
| 7 | Acetonitrile | 6.03 | 0.63 | 44 |
| 8 | Methylene chloride | 3.9 | 0.7 | 42 |
| 9 | Benzene | 4.5 | 0.5 | 37 |

EXAMPLE 10

16 g of acrylonitrile stabilized by a 1/1000 part by weight of hydroquinone, 0.48 g of ruthenium triiodide and 30 cm³ of methoxyethanol are charged into a 125 cm³ stainless steel autoclave, a hydrogen pressure of 40 bars is then set up, and the mixture heated to 110° C. for 6 hours. After the treatment described in Example 1, 4.9 g of 1,4-dicyanobutene are obtained, representing a yield of 48 percent of theory relative to the acrylonitrile consumed.

EXAMPLE 11

160 g of acrylonitrile, 0.08 g of hydroquinone and 0.8 g of ruthenium acetylacetonate are charged into a 500 cm³ autoclave. An initial hydrogen pressure of 40 bars is set up and the mixture heated to 110° C. for 6 hours, the hydrogen pressure being readjusted to its initial value whenever it falls to 20 bars. When the absorption of hydrogen has ended, the mixture is cooled, the gas released from the autoclave, and the volatile fractions, consisting mainly of propionitrile, are removed by concentration under a vacuum from a water pump. The mixture which has thus been concentrated is then distilled in vacuo and 76.4 g of a fraction of b.p.$_{0.65}$ = 111° to 120° C. are collected, this being chromatographically pure adiponitrile. The distillation residue which contains the catalyst may be directly used for a further reaction.

When the same experiment is carried out in the presence of unstabilized distilled acrylonitrile, it leads to the formation of a practically equal amount of adiponitrile. The same is true in the case of commercial acrylonitrile stabilized with 0.005 percent by weight of ammonia.

On repeating the same experiment but replacing the hydrogen pressure by nitrogen pressure, no dimerization occurs.

EXAMPLES 12 TO 18

16 g of acrylonitrile stabilized with a 1/1000 part by weight of hydroquinone, 0.4 g of ruthenium acetylacetonate, 30 cm³ of an organic solvent, and hydrogen up to a pressure of 40 bars, are charged into a 125 cm³ stainless steel autoclave. Thereafter the mixture is heated to 110° C. for 6 hours, hydrogen being replaced as in the previous example. There is thus obtained adiponitrile, as shown in Table I below.

TABLE I

| Ex. | Solvent | Adiponitrile |
|---|---|---|

| 12 | methoxyethanol | 5.8 g |
| 13 | cyclohexane | 4.8 |
| 14 | acetone | 5.3 |
| 15 | benzene | 5.6 |
| 16 | diethyleneglycol dimethyl ether | 6.6 |
| 17 | methanol | 5.1 |
| 18 | propionitrile | 6.05 |

EXAMPLES 19 TO 24

The examples given in the form of Tables II and III below show the yields of 1,4-dicyanobutenes or adiponitrile or mixtures of these products which are obtained when the working conditions are varied for a given catalyst. All the experiments were carried out in an autoclave identical to that of Example 1, using 40 g of acrylonitrile stabilized with a 1/1000 part by weight of hydroquinone in each experiment, and working at a constant hydrogen pressure throughout a given experiment.

TABLE II

Catalyst: ruthenium acetylacetonate (0.4 g.)

| Ex. | Duration (hours) | Temperature, °C. | $H_2$ pressure (bars) | Dimers obtained DCB (g.) | Dimers obtained ADN (g.) | Total yield relative to the A.N. converted, percent |
| --- | --- | --- | --- | --- | --- | --- |
| 19 | 8 | 130 | 5 | 18.1 | | 54.8 |
| 20 | 6 | 110 | 10 | 10.9 | 11 | 54.2 |
| 21 | 6 | 110 | 20 | | 20.7 | 50.8 |

NOTE.—DCB=1,4-dicyanobutene; ADN=adiponitrile; A.N.=acrylonitrile.

TABLE III

Catalyst: ruthenium stearate

| Ex. | Ru stearate [1] (g.) | Duration (hours) | Temperature, °C. | $H_2$ pressure (bars) | Dimers obtained DCB (g.) | Dimers obtained ADN (g.) | Total yield relative to the A.N. converted, percent |
| --- | --- | --- | --- | --- | --- | --- | --- |
| 22 | 0.950 | 6 | 110 | 10 | 19.9 | | 49.7 |
| 23 | 0.475 | 16 | 110 | 10 | 6.4 | 14.8 | 52 |
| 24 | 0.475 | 6 | 120 | 20 | | 18.4 | 45 |

[1] The ruthenium stearate was prepared by reaction of ruthenium trichloride with sodium stearate.

EXAMPLES 25 TO 27

An identical autoclave to that of Example 1 is charged with 40 g of acrylonitrile containing 0.02 g of hydroquinone and the catalyst, followed by hydrogen up to a pressure of 40 bars, and is heated at 110° C. for 6 hours, the pressure being returned to its initial value when it falls to 20 bars. After carrying out the separation treatments described above, the results given in Table IV below are obtained.

TABLE IV

| Ex. | Ruthenium derivative used (amount in g) | Product obtained ADN (g) | Product obtained DCB (g) |
| --- | --- | --- | --- |
| 25 | trichloride 0.4 | 14.2 | 3.5 |
| 26 | methylacetylacetonate 0.4* | 16.9 | |
| 27 | acetylacetonate 0.4 | 20.4 | |

*the ruthenium methylacetylacetonate was prepared by reaction of methylacetylacetone with ruthenium trichloride at pH 7.

EXAMPLE 28

Working as in Examples 25 to 27 but using 0.5 g of ruthenium (III) 1,1,1-trifluoroacetylacetonate as the catalyst, 16.2 g of a mixture are obtained which contains 85 percent of 1,4-dicyanobutenes and 15 percent of adiponitrile (percentages by weight), which is a yield of dimeric products of 45 percent of theory, relative to the acrylonitrile converted. (The ruthenium 1,1,1-trifluoroacetylacetonate was prepared by reaction of trifluoroacetylacetone with ruthenium trichloride in the presence of a stoichiometric amount of sodium acetate).

EXAMPLE 29

A mixture of:
161.4 g of acrylonitrile stabilized with a
1/2000 part by weight of hydroquinone, and
0.8 g of ruthenium acetylacetonate
was heated at 130° C. for 7 hours 30 minutes at a constant hydrogen pressure of 10 bars.

When the reaction was over, there were obtained 10.8 g of unconverted acrylonitrile, 54.9 g of propionitrile and 89.3 g of a mixture of 1,4-dicyanobutenes and adiponitrile containing 90% by weight of 1,4-dicyanobutenes. The overall yield of dinitriles is 59 percent of theory relative to the acrylonitrile converted.

EXAMPLE 30

16 g of acrylonitrile containing 0.02 g of hydroquinone, 0.35 g of the ruthenium chloride/butadiene complex of formula $RuCl_2 C_{12} H_{18}$, and 30 cm³ of methoxyethanol are charged into a 125 cm³ stainless steel autoclave, an initial hydrogen pressure of 40 bars is then set up, and the mixture thereafter heated at 110° C. for 6 hours. The final pressure is about 8 bars. 3.01 g of unconverted acrylonitrile and 6 g of 1,4-dicyanobutene-1 (b.p.$_{0.5}$ = 89° to 102°) are recovered from the reaction mixture by distillation. Yield: 46.2 percent of theory relative to the acrylonitrile converted.

The complex used as the catalyst was prepared by the method of LYDON and collaborators, Proceedings of Chem. Soc. p. 421 (December 1964), by heating ruthenium chloride ($Ru Cl_3$) to 100° C. with butadiene in 2-methoxy-ethanol.

EXAMPLE 31

A mixture consisting of 32 g of acrylonitrile stabilized with hydroquinone and 0.2 g of the ruthenium complex used in the preceding Example was heated to 110° C. for 23 hours, the heating being carried out under a hydrogen pressure of 40 bars which is kept constant. Under these conditions 12.4 g of chromatographically pure adiponitrile are obtained, which is a yield of 38 percent relative to the acrylonitrile converted.

EXAMPLES 32 TO 36

A mixture consisting of 40 g of acrylonitrile stabilized with hydroquinone and 0.200 g of dichlorotetrakis (acrylonitrile) ruthenium-II is heated in an atmosphere of hydrogen, either without replacing the hydrogen consumed (experiment 32) or with the hydrogen being recharged so as to maintain a practically constant pressure (experiments 33 to 36). At the end of the reaction the unconverted acrylonitrile and the desired dinitriles are separated by working as in the preceding examples. The following Table V, which shows the working conditions for each experiment, indicates the results obtained.

TABLE V

| Ex. | H₂ pressure in bars | | Temp. (° C.) | Duration (hours) | DCB (g.) | ADN (g.) | Total yield of DCB plus ADN (percent) |
|---|---|---|---|---|---|---|---|
| | Initial | Final | | | | | |
| 32 | 40 | 15 | 100 | 6 | 13.2 | | 59 |
| 33 | 10 | 10 | 110 | 16 | 22.4 | | 59 |
| 34 | 20 | 20 | 100 | 7.5 | 8.9 | | 56 |
| 35 | 30 | 30 | 100 | 7.5 | 13.7 | | 55 |
| 36 | 40 | 40 | 110 | 12 | 10.8 | 8 | 47 |

The dichlorotetrakis(acrylonitrile)ruthenium-II used as the catalyst was prepared by heating a mixture consisting of 64 g of acrylonitrile (containing 0.08 g of hydroquinone) and 4 g of ruthenium trichloride dissolved in 80 cm³ of methoxyethanol under reflux for 28 hours in an atmosphere of nitrogen, followed by filtration of the unreacted ruthenium trichloride and concentration of the filtrate in vacuo.

EXAMPLES 37 TO 46

Various experiments were carried out with complexes prepared from ruthenium chloride and various electron donors, as indicated in Table VI below, using acrylonitrile stabilized with hydroquinone and working with an autoclave identical to that of Example 1, at 110° C., the remaining working conditions being specified for each experiment in the table.

| Ex. | Catalyst, nature | Weight (g.) | Stabilised acrylonitrile (g.) | Solvent (cm³) | Duration (hours) | H₂ pressure | | Dimers obtained | | | Total yield, percent |
|---|---|---|---|---|---|---|---|---|---|---|---|
| | | | | | | Maintained constant (bars) | Experiments without replacement; initial pressure (bars) | Total weight in g. | Proportion by weight | | |
| | | | | | | | | | DCB | ADN | |
| 37 | RuCl₃(CH₃CN)₃ᵃ | 0.300 | 40 | 0 | 16 | 10 | | 6.6 | 100 | 0 | 56 |
| 38 | RuCl₃(CH₃CN)₃ | 0.300 | 16 | ¹30 | 6 | | 40 | 7 | 100 | 0 | |
| 39 | RuCl₂(CH₃CH₂CN)₃ᵇ | 0.200 | 16 | ¹30 | 6 | | 40 | 6.2 | 90 | 10 | 47 |
| 40 | RuCl₃(CH₃CH₂CN)₃ | 0.200 | 40 | 0 | 16 | 10 | | 12.9 | 90 | 10 | 55 |
| 41 | RuCl₂(C₆H₅CN)₄ᶜ | 0.200 | 16 | 0 | 6 | | 40 | 6.8 | 85 | 15 | 42 |
| 42 | RuCl₂(C₅H₅N)₄ᵈ | 0.200 | 16 | 0 | 6 | | 40 | 5.5 | 85 | 15 | 34 |
| 43 | Ru₂Cl₄[C₆H₅(C₂H₅)₂I]₆ᵉ | 0.140 | 16 | 0 | 6 | | 40 | 7.6 | 85 | 15 | 51 |
| 44 | [RuCl₂(C₈H₁₂)]ₙᶠ | 0.200 | 40 | 0 | 6 | | 40 | 9.6 | 90 | 10 | 57 |
| 45 | RuCl₃(C₂H₅—S—C₂H₅)₃ᵍ | 0.477 | 40 | 0 | 6 | 30 | | 19 | 66 | 33 | 00 |
| 46 | RuCl₂(C₈H₁₂)-bis-p-toluidine ᵈ | 0.196 | 40 | 0 | 6 | | 40 | 14 | 90 | 10 | 57 |

¹ Methoxyethanol.
ᵃ Prepared by reacting acetonitrile with ruthenium trichloride under reflux in nitrogen.
ᵇ Prepared by reacting propionitrile with ruthenium trichloride under reflux in nitrogen.
ᶜ Prepared by reacting benzonitrile with ruthenium trichloride in refluxing 2-methoxyethanol.
ᵈ Prepared according to the method described in J. Chem. Soc. 3178 (1959).
ᵉ Prepared according to the method described in J. Chem. Soc. 3466-3475 (1964).
ᶠ Prepared according to the method described in Chemistry and Industry (1959) 1516.
ᵍ Prepared according to the method described in J. Chem. Soc. 2627 (1964).

EXAMPLE 47

A 125 cm³ stainless steel autoclave was charged with:
16 g of stabilized acrylonitrile,
0.07 g of diodotetrakis(acrylonitrile)ruthenium, and
30 cm³ of 2-methoxyethanol,
hydrogen was then introduced up to a pressure of 40 bars, and the mixture heated to 110° C. for 6 hours. When the reaction had ceased the reaction mixture was distilled, initially at normal pressure to yield 9.7 g of acrylonitrile and 2.7 g of propionitrile, and subsequently in vacuo to yield 2.9 g of 1,4-dicyanobutenes, the yield of dimers being 46 percent of theory relative to the acrylonitrile converted.

The diodotetrakis(acrylonitrile)ruthenium was prepared in a similar manner to the dichlorotetrakis(acrylonitrile)ruthenium but using ruthenium iodide.

EXAMPLE 48

A 125 cm³ autoclave was charged with:
16 g of stabilized acrylonitrile,
0.25 g of bis(acrylonitrile)ruthenium dicarbonyl, and
30 cm³ of 2-methoxyethanol,
hydrogen was then introduced up to a pressure of 40 bars and the mixture heated for 6 hours at 110° C. When the reaction had ceased the mixture was treated as described in the preceding example, and 3.5 g of a mixture consisting of 80 percent of 1,4-dicyanobutenes and 20 percent of adiponitrile, (the percentages being by weight) was obtained.

The bis(acrylonitrile)ruthenium dicarbonyl was obtained by reaction of acrylonitrile with [Ru(CO)₄]₃ under reflux for 2½ hours.

We claim:
1. A process for converting acrylonitrile to its straight chain linear di-cyano dimer or its straight chain linear di-cyano hydrodimer which comprises dimerizing acrylonitrile in the presence of molecular hydrogen at a temperature of 50° to 150° C. under a hydrogen pressure of 1 to 50 bars and in the presence of a ruthenium compound as catalyst.

2. A process according to claim 1 wherein the catalyst is a member selected from the group consisting of the ruthenium salts of mineral and organic acids.

3. A process for the preparation from acrylonitrile of a member selected from the group consisting of 1,4-dicyanobutene, adiponitrile and mixtures thereof, comprising heating acrylonitrile to a temperature of 50° to 150° C. under a hydrogen pressure of 1 to 50 bars in the presence of, as catalyst, a ruthenium catalyst selected from the group consisting of ruthenium halides, complexes formed between a ruthenium halide and an electron donor, ruthenium chelate complexes and ruthenium salts of fatty acids.

4. A process as claimed in claim 3 wherein the catalyst is a ruthenium catalyst selected from the group consisting of a ruthenium halide, thiocyanate, sulphate, nitrate, oxyhalide, hydroxyhalide, acetate, oxalate, stearate, naphthenate, alcoholate, phenate, and alkali and alkaline earth ruthenates, halogenoruthenates of sodium and potassium, nitrosochlororuthenium, trichlororuthenium hexamine, ruthenium acetylacetanate, 3-bromo-2-4-pentadionatoruthenium (III), 1,1,1-trifluoro 2,4-pentadionateruthenium (III), ruthenium glyoximate, quinolinate, and salicylaldehydate, and ruthenium derivatives of ethylene diamine, α,α' dipyridyl and o-phenanthroline, and complexes of ruthenium derivatives wherein the ruthenium derivatives are halogenated carbonylated or nitrosylated ruthenium derivatives, with electron donating agents having lone electron pairs, said agents selected from the group consisting of phosphines, arsines, stibines, and amines, and complexes obtained by reacting ruthenium halides and hydridohalides with aliphatic and cycloaliphatic monoolefines and diolefines, acrylic and methacrylic derivatives, saturated and unsaturated aliphatic, cycloaliphatic, and aromatic nitriles and dinitriles, and aromatic and aliphatic isonitriles.

5. A process for the preparation from acrylonitrile of a member selected from the group consisting of 1,4-dicyanobutene and/or adiponitrile which comprises heating at 100° to 130° C. acrylonitrile under a hydrogen pressure of 5 to 40 bars in the presence of, as catalyst, a member selected from the group consisting of mineral and organic ruthenium derivatives.

* * * * *